July 11, 1933.    D. F. OTHMER    1,917,391
PROCESS OF DEHYDRATING AQUEOUS ACETIC ACID
Filed Feb. 15, 1930
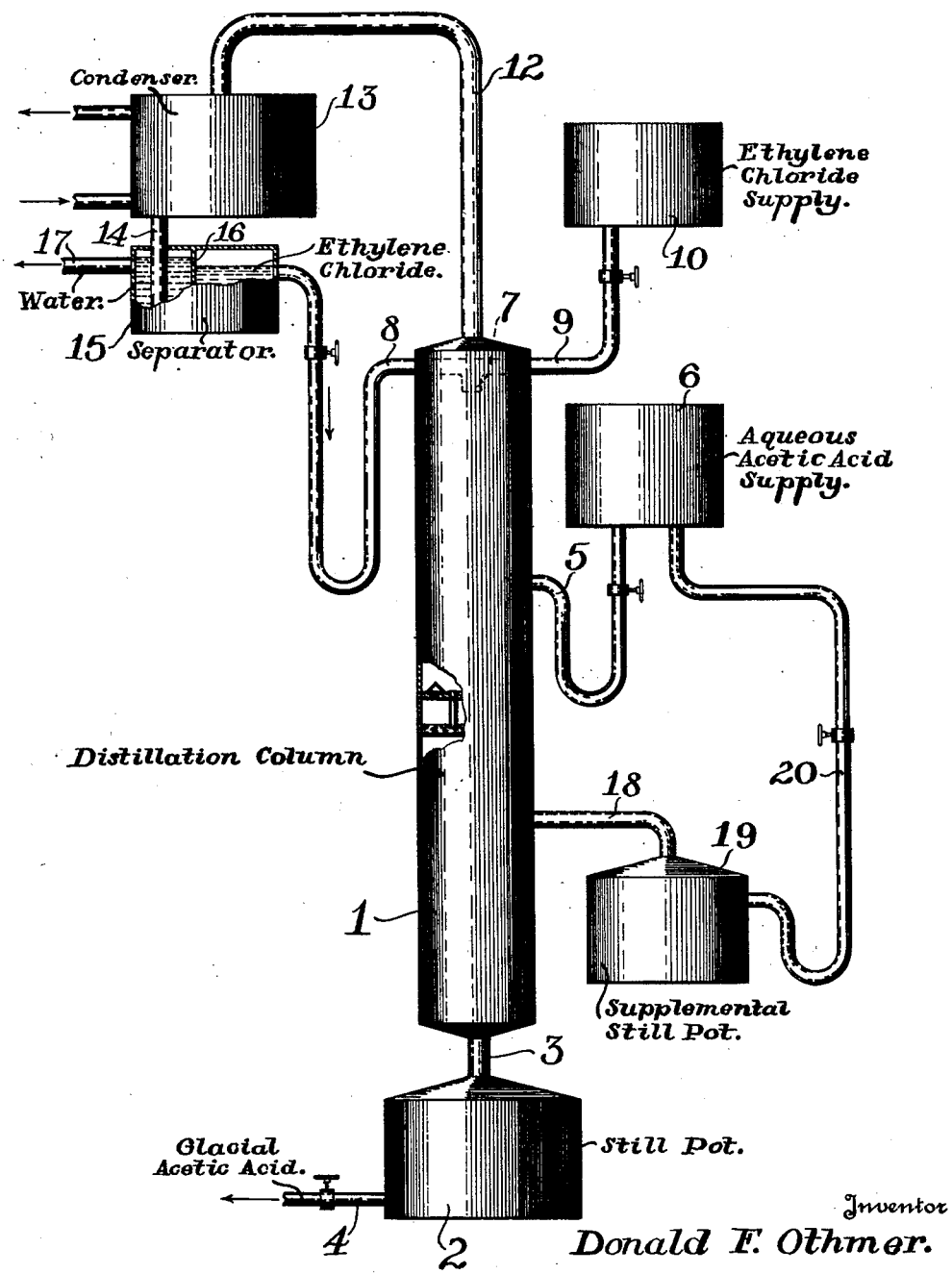

Patented July 11, 1933

1,917,391

UNITED STATES PATENT OFFICE

DONALD F. OTHMER, OF ROCHESTER, NEW YORK, ASSIGNOR TO EASTMAN KODAK COMPANY, OF ROCHESTER, NEW YORK, A CORPORATION OF NEW YORK

PROCESS OF DEHYDRATING AQUEOUS ACETIC ACID

Application filed February 15, 1930. Serial No. 428,625.

This invention relates to processes for substantially completely dehydrating aqueous acetic acid and relates more particularly to a process of dehydrating aqueous acetic acid in which ethylene dichloride hereinafter referred to by the more common name of ethylene chloride is employed as an entraining liquid for the water in the acid.

Various processes for the concentration or dehydration of acetic acid have been devised, some of which operate upon the principle of separation of the components mixed with the acetic acid by rectification of distilled vapors while others operate upon the principle of employing a liquid with the aqueous acetic acid which forms a constant boiling mixture that includes the water whereby this constant boiling mixture is vaporized and carries away with it at least a portion of the water present in the acid mixture. However, until the invention was made which is set forth in the co-pending application Serial Number 232,916 filed November 12, 1927, in which I am a joint inventor with Hans T. Clarke, no process had been devised which would efficiently and substantially completely dehydrate aqueous acetic acid solutions without additional distillation operations being performed upon the azeotropic distillate.

While the invention set forth in the above-named Clarke and Othmer application is a distinct improvement over the methods known prior thereto, I have found that even that process can be improved upon by making it a unitary process, that is, I have found that by proper regulation of the length of the distillation column not only dehydration of the acetic acid can be accomplished in that column, but also the ethylene dichloride which is employed to form the azeotropic distillate with water can be separated from the concentrated acetic acid in the same column so that pure concentrated acetic acid issues from the bottom of the column or from the still which supplies the heat to the column. This effects a considerable saving in apparatus in that it eliminates the employment of an additional column and also saves a considerable amount of heat in the concentration process when taken as a whole. My improved process is also better adapted to continuous operation.

I have also found that the efficiency of the concentrating system may be further improved by the employment of an additional still pot into which aqueous acetic acid is introduced and which vaporizes the aqueous acetic acid so that it is introduced into the distillation column at a suitable point therein, in vaporous form rather than being introduced in liquid form as has heretofore been the practice. By such procedure no more heat is required to vaporize the aqueous acetic acid than heretofore and the column is not contaminated with impurities such as salt or other corrosive materials or the higher boiling organic materials which may contaminate aqueous acetic acid, particularly waste acid that is being recovered from processes such as the acetylation of cellulose. Suitable draw-offs or settling chambers may be provided to supplement the additional still pot so that the contaminating products may be periodically or even continuously withdrawn therefrom to rid the system thereof.

It is among the objects of my invention therefore to provide a unitary process for the dehydration of aqueous acetic acid, which process is adapted to continuous operation if desired. It is a further object of my invention to introduce all or a considerable portion of the aqueous acetic acid into the distilling column in the form of a mixed vapor rather than in liquid form, although it will be understood that this is a more or less ideal condition which assists the operation of the unitary process but is not a necessity thereto. Numerous other objects will appear to those skilled in the art upon a perusal of the following description and drawing constituting a part hereof.

In the drawing accompanying this specification and constituting a part thereof, in which like reference characters refer to like parts, the numeral 1 represents a distillation column of well-known construction such as a column provided with a series of plates with bubble cap construction so that the vapors rising in the column are caused to pass through the liquid which is collected upon each plate. A portion of the column is broken away to show in diagrammatic form the construction of the plates. For carrying out my process I have found a column still of approximately 40-plate construction to be suitable. At the bottom of the column is provided a still pot 2 of the usual construction such as that heated by steam pipes or other well-known means. This still pot is connected with the column by a pipe 3 for the purpose of conducting vapors arising from the still pot into the column 1. A suitable draw-off pipe 4 equipped with a valve is provided for the still pot 2 by means of which substantially pure glacial acetic acid may be withdrawn from the still pot as hereinafter further discussed.

At a point approximately two-thirds of the way up the column or, in other words, at approximately plate 25, is provided a valved inlet pipe 5 for the introduction into the column of aqueous acetic acid from the acid supply tank 6, mounted preferably above the inlet pipe in order that the acid will flow into the column by means of gravity. In the top portion of the column 1 and at a point above the uppermost plate in the column is provided an ethylene chloride inlet 7. Two valved ethylene chloride supply pipes, 8 and 9, connected with the inlet 7 are provided for the introduction of ethylene chloride into the top of the column. The supply pipe 9 is connected with an ethylene chloride supply tank 10 for a purpose hereinafter to be discussed. The function of the supply line 8 will also be further related.

At the head of the column 1 is provided a vapor outlet or pipe 12 which is connected with the condenser 13 which may be cooled by any suitable medium such as water entering and leaving by the pipes shown. Any condensate accumulating in the condenser 13 is conducted by means of a pipe 14 into the separator 15 which separator is provided with a baffle plate 16 extending to within a short distance of the bottom of the separator. The pipe 17 carries away water which separates out in the separator and the pipe 8 conducts ethylene chloride which separates out in the separator back to the head of the column for re-use therein. At a point approximately one-third of the way up the column 1, or approximately opposite plate number 14 of the column, is provided a vapor inlet 18 which connects the supplemental still pot 19 with the column 1. A valved pipe line 20 is provided to conduct aqueous acetic acid from the acid supply tank 6 to the supplemental still pot 19.

The still pot 19 may be of similar construction to the still pot 2 and may also be provided with outlet for withdrawing from the still pot 19 such residual impurities as may collect therein. It will be obvious that the construction above described is merely diagrammatic and that the elements described are all well known to those skilled in this art and may be of such suitable construction as would be employed by any distillation engineer.

Assuming the plant to be newly constructed it is necessary, of course, in order to place it in operation that the still pot 2 be charged with glacial acetic acid and that a supply of aqueous acetic acid and ethylene chloride be at hand and be contained in the tanks 6 and 10 respectively. Through the pipe 5, aqueous acetic acid is introduced slowly into the column 1 and heat applied to the still pot 2. It may be stated at this point that aqueous acetic acid analyzing anywhere from 1 to 2% to 98% or more of acetic acid may be profitably and successfully concentrated by my process to as strong as 99.8% or more purity. At the same time a supply of ethylene chloride is introduced into the column 1 through the pipe 9. Upon starting the process, therefore, the plates of the lower two-thirds of the column will contain aqueous acetic acid and the plates of the upper third of the column will contain ethylene chloride. This condition exists, however, only at the start of the process as the process soon comes to equilibrium and operates in a continuous manner.

Assuming therefore that the process is in continuous operation, it operates in the following manner: Upon at least the top plate of the column there exists a constant boiling mixture of ethylene chloride and water, it being necessary only to maintain upon the upper plate of the column a slight excess of ethylene chloride. This constant boiling mixture of ethylene chloride and water vaporizes due to the heat supplied to the column from the still pot 2 and the vapor mixture of water and ethylene chloride passes over through the pipe 12 into the condenser 13 wherein the vapor condenses into a liquid mixture of ethylene chloride and water which passes through the pipe 14 into the separator 15.

In this separator the ethylene chloride, being the heavier of the two liquids, settles to the bottom and passes under the baffle 16 into the right-hand section of the separator, is continuously drawn off therefrom by means of the pipe 17 leading to the sewer. The pipe 8 controlled by a valve returns the ethylene chloride to the head of the column where by means of the inlet 7 it is re-introduced into the system. The process being in continuous operation, it is necessary to introduce very little ethylene chloride from the supply tank 10 inasmuch as it is used only to supply the small amount of ethylene chloride which may be lost in the system, such as through slight leakage or through being carried off by slight occlusion or solution in the water drawn off from the separator by the pipe 17. Assuming that the process is being operated without the assistance of the supplemental still pot 19, aqueous acetic acid is continuously introduced through the pipe 5 at a rate equivalent to the capacity of the column still 1 for dehydrating the aqueous acetic acid. From the point where the aqueous acetic acid is introduced into the column, if we proceed downward, plate by plate, it will be found that the percentage of water in the aqueous acetic acid decreases. If we proceed upward from the point at which the pipe 5 enters the column still, we will find that the percentage of acetic acid contained in the mixture upon each plate will decrease until on the top plate substantially no acetic acid exists in the mixture. Also as we proceed upwardly in the upper plates of the column we will find that the percentage of water in the ethylene chloride mixture increases. The converse of this is that as we proceed downwardly from the uppermost plate of the column, the proportion of water to ethylene chloride very markedly decreases until at the lower plates of the column, nothing but ethylene chloride and acetic acid exist upon each plate. As we proceed downwardly through the lower plates of the column, we will find that the ratio of ethylene chloride to acetic acid decreases until at the lowermost plate of the column it will be found that substantially pure acetic acid exists. It will, therefore, be observed that this lower portion of the column 1 is made to perform the same function as the additional or supplemental column required in most processes of this general type. This substantially pure acetic acid refluxes into the still pot 2 where the excess accumulating is drawn off through the pipe 4 and conducted to storage or such use as may be intended.

If instead of introducing the aqueous acetic acid in liquid form by means of the pipe 5 it be desired to employ the supplemental still pot 19 we may assume that the pipe line 5 is entirely shut off and the aqueous acetic acid is conducted directly to the still pot 19. In this still pot 19 the aqueous acetic acid is vaporized and the mixed vapors of water and acetic acid are conducted by means of the pipe 18 into the column 1 at a point approximately one-third the way up the column. These acetic acid and water vapors then travel up the column and meet the downwardly progressing stream or supply of ethylene chloride. The water combining with the ethylene chloride forms, of course, a constant boiling mixture which distills off and passes in a vaporous state to the next higher plate and so on up the column; the acetic acid not vaporizing, of course, passes down the column so that the cycle occurring when the supplemental still pot 19 is utilized is the same in principle as when the aqueous acetic acid is introduced into the column through the pipe 5 in liquid form, the difference being merely in the detail that the composition of the mixture upon each plate will vary slightly due to the fact that the water in liquid or vapor form, respectively, is introduced at a different position in the column. The pipe 18 may of course be provided with a suitable check valve in the event it may be desired to change from one mode of operation to the other at different times. As will be understood by those skilled in the art, the exact point in the column at which the liquid or vaporous aqueous acetic acid is introduced is best determined by practice. Suffice it to say, the attempt should be made to introduce the material to be dehydrated at a point where the composition of the mixture in the column has substantially the same water content as that being introduced.

It is also possible to simultaneously introduce the aqueous acetic acid in vapor form through the line 18 and in liquid form through the line 5 and operate the process in that manner. In any event in operating this process by any of the methods indicated it is necessary merely that the operator control the input of the various materials into the column in such a way that substantially pure concentrated acetic acid issues from the bottom of the column and that a constant boiling mixture of ethylene chloride and water exists upon the top plate of the column.

Suitable means for economizing heat will, of course, be employed as known to all distillation engineers, such as insulating the still, the column and the pipes which conduct vapors or heated materials. Special metals may be employed for those portions of the system which contact with the aqueous acetic acid such, for instance, as alloys which are resistant to acetic acid. The draw-off that is provided for the supplemental still pot 19 may consist merely of a pipe issuing from the bottom thereof by which may be drained off from the still pot such accumulation of impurities as it may be desired to dispense with. It will be obvious that if the impure acetic acid is introduced into the system entirely by way of vapors discharged from the supplemental still pot 19 that no substantial contamination can reach the column or the still pot 2. In the event that the supplemental still pot 19 is not employed, it may be desirable to have the glacial acetic acid draw-off pipe 4 slightly higher in position than that shown and to have a further draw-off pipe located in the bottom of the still pot 2 by means of which impurities settling to the bottom may be continuously or occasionally drawn off from the still pot 2. Numerous other modifications not material to the general principle of operation of my invention will, of course, occur to those skilled in the art and, of course, are to be included within the scope of this invention so long as defined by the language of the claims appended hereto.

As will be gathered from the foregoing description the advantages of my invention are many. Even without employing the supplemental still pot the process is unitary in its operation in that it is necessary to employ only a single unitary column which not only accomplishes the dehydration of the acetic acid but also removes from the acetic acid the ethylene chloride which it had previously been thought necessary to separate from the acetic acid in a separate column or still. Reference herein and in the claims to a unitary column is not to be understood as necessarily designating a one piece construction since it is obvious that in the interest of economy of space it may in some cases be desirable to construct it in two or more sections placed one above or alongside of the other, or in staggered relation, but, as far as the dehydration process is concerned, in every case operating as a single unit.

The process is, of course, continuous in its operation and can be operated for weeks or even months without a single shut-down, it being merely necessary to continuously introduce into the column the aqueous acetic acid to be dehydrated and to conduct away from the still pot 2 the purified glacial acetic acid. The number of attendants necessary to operate such a process are surprisingly small as once the system is in operation and the controls set, it is necessary merely for an operator to check the system occasionally to make certain that everything is operating properly. Of course, when the supplemental still pot 19 is employed, additional advantages are obtained in that no impurities are introduced into the column still, making the cleaning thereof unnecessary for much greater periods of time than when the supplemental still pot is not employed. Furthermore, additional heat is not required when employing the supplemental still pot, over that necessary without it, inasmuch as the column operates upon the principle of the total heat supplied to the column and that amount will be the same whether it is introduced by way of the supplemental still pot 19 or by way of the still pot 2 entirely. Other advantages that are too numerous to be set forth here will, of course, be apparent.

Although it will be noted that I have referred to the use of ethylene chloride throughout this specification, it will be understood that ethylene chloride is the compound which is sometimes also termed ethylene dichloride and that the compound is the saturated one having the formula $CH_2Cl \cdot CH_2Cl$. This compound is, of course, not to be confused with the totally different unsaturated compound known as dichlorethylene. The advantage of ethylene chloride will be apparent in that its boiling point of 84° C. is quite nearly that theoretically desirable, to form the most suitable azeotropic mixture with water, the compound is a stable one under the temperatures employed and forms with water (but not with acetic acid) a binary constant boiling mixture.

It will be noted that when this binary mixture vaporizes no more than mere traces of acetic acid will be carried over, for instance, only that amount which might be mechanically entrained with any vapor stream. In any event, the amount of acetic acid passing over is so very slight that it is a matter of no concern inasmuch as the water which separates from the ethylene chloride in the separator 15 is conducted to the sewer without any appreciable loss of acetic acid.

While my process has been described as applicable to dehydrating aqueous acetic acid with the aid of ethylene chloride, it will be understood that the method features thereof, such as the use of a single column for carrying on the process and the unitary and continuous attributes thereof, or the use of a supplemental still pot for introducing the aqueous acetic acid in vaporous form, or other similar features thereof, are equally applicable to such azeotropic distillation processes as defined in the application of Clarke and Othmer, Serial No. 428,641, filed February 15, 1930, wherein trichlorethylene is employed as the entraining liquid, or in the application of Clarke and Othmer, Serial No. 428,642, filed February 15, 1930, wherein carbon tetrachloride is employed as the entraining liquid.

What I claim as my invention and desire to be secured by Letters Patent of the United States is:

1. In the process of dehydrating aqueous acetic acid in which is employed a unitary column still having fractionating plates, the steps which comprise introducing an organic chloride water entraining liquid at the head of the column, introducing a mixture of water and acetic acid vapors into the column at a point approximately one-third of the way up the column, condensing and separating the vapors of the water and entraining liquid issuing from the column, and returning the entraining liquid to the top of the column.

2. In the process of dehydrating aqueous acetic acid in which is employed a unitary column still having fractionating plates, the steps which comprise introducing ethylene chloride at the head of the column, introducing a mixture of water and acetic acid vapors into the column at a point approximately one-third of the way up the column, condensing and separating the water and ethylene chloride vapors issuing from the column, and returning the ethylene chloride to the top of the column.

3. In the process of dehydrating aqueous acetic acid in which is employed a unitary column still having fractionating plates, the steps which comprise introducing an organic chloride water entraining liquid at the head of the column, introducing a mixture of water and acetic acid vapors into the column at a point in approximately the center third of the column, condensing and separating the vapors of the water and entraining liquid issuing from the column, and returning the entraining liquid to the top of the column.

4. In the process of dehydrating aqueous acetic acid in which is employed a unitary column still having fractionating plates, the steps which comprise introducing ethylene chloride at the head of the column, introducing a mixture of water and acetic acid vapors into the column, at a point in approximately the center third of the column, condensing and separating the water and ethylene chloride vapors issuing from the column, and returning the ethylene chloride to the top of the column.

5. In the process of dehydrating aqueous acetic acid containing dissolved or suspended impurities which have a tendency to precipitate out on concentration of said acid and in which is employed a unitary column still, the steps which comprise introducing an organic chloride water-entraining liquid into the head of the still, introducing by means of a supplemental still pot a vaporized mixture of water and acetic acid into the still unit at a point located in approximately the center third thereof, condensing and separating the vapors of the water and entraining liquid issuing from the upper end of the still and returning the entraining liquid to the top of the column.

6. In the continuous process of dehydrating aqeuous acetic acid in which is employed a unitary column still having fractionating plates, the steps which comprise introducing an organic chloride-water entraining liquid at the head of the column, introducing a mixture of water and acetic acid vapors into the column at a point where the composition of the mixture in the column has substantially the same water content as that being introduced, condensing and separating the vapors of the water and entraining liquid issuing from the column, and returning the entraining liquid to the top of the column.

7. In the continuous process of dehydrating aqueous acetic acid in which is employed a unitary column still having fractionating plates, the steps which comprise introducing ethylene chloride at the head of the column, introducing a mixture of water and acetic acid vapors into the column at a point where the composition of the mixture in the column has substantially the same water content as that being introduced, condensing and separating the water and ethylene chloride vapors issuing from the column, and returning the ethylene chloride to the top of the column.

Signed at Rochester, New York, this 11th day of February 1930.

DONALD F. OTHMER.